United States Patent [19]

Philippsen

[11] Patent Number: 4,971,722
[45] Date of Patent: Nov. 20, 1990

[54] THICKENING AGENTS

[75] Inventor: Elke Philippsen, Kreuzau, Fed. Rep. of Germany

[73] Assignee: Akzo N.V., Arnhem, Netherlands

[21] Appl. No.: 248,930

[22] Filed: Sep. 26, 1988

[30] Foreign Application Priority Data

Sep. 26, 1987 [DE] Fed. Rep. of Germany ....... 3732499
Sep. 2, 1988 [DE] Fed. Rep. of Germany ....... 3829840

[51] Int. Cl.$^5$ ............................................. B01J 13/00
[52] U.S. Cl. ............................. 252/315.1; 252/315.01; 252/11; 252/73
[58] Field of Search ............... 252/315.01, 11, 73, 252/315.1

[56] References Cited

U.S. PATENT DOCUMENTS

| | | | |
|---|---|---|---|
| 3,799,878 | 3/1974 | Komatsu et al. | 252/79 |
| 4,005,051 | 1/1977 | Brunner | 524/310 |
| 4,198,243 | 4/1980 | Tanaka | 106/19 |
| 4,310,436 | 1/1982 | Camp | 252/315.1 |
| 4,312,768 | 1/1982 | Nassry et al. | 252/32.7 E |
| 4,312,775 | 1/1982 | Panek et al. | 252/315.1 |
| 4,384,965 | 5/1983 | Hellsten et al. | 252/32.5 |
| 4,395,351 | 7/1983 | Camp | 252/315.1 |
| 4,485,031 | 11/1984 | Olstowksi et al. | 252/182.26 |
| 4,491,526 | 1/1985 | Deck | 252/32.5 |
| 4,521,326 | 6/1985 | Seibert et al. | 252/174.21 |
| 4,774,017 | 9/1988 | Seibert et al. | 252/174.12 |

FOREIGN PATENT DOCUMENTS

| | | |
|---|---|---|
| 3302465 | 9/1983 | Fed. Rep. of Germany . |
| 3630319 | 3/1988 | Fed. Rep. of Germany . |
| 38298392 | 9/1988 | Fed. Rep. of Germany . |
| 0152688 | 12/1981 | German Democratic Rep. . |
| 850990 | 10/1960 | United Kingdom . |

OTHER PUBLICATIONS

Davidsohn et al., "Synthetic Detergents", Sixth Edition, p. 12.
Klamann, "Lubricants and Related Products", Verlag Chemie, 1984, pp. 210–211.
Encyclopedia of Chemical Technology, Third Edition, vol. 12, 1980, pp. 719 and 732.

*Primary Examiner*—John M. Ford
*Assistant Examiner*—Catherine Scalzo
*Attorney, Agent, or Firm*—Oliff & Berridge

[57] ABSTRACT

Thickening agents contain polyether derivatives and low-molecular-weight alkylene glycol alkyl ethers, further common additives as required, and water as the rest, up to 100%. Mono-, di- or trialkylene glycol alkyl ethers are preferred. It is possible to prepare stock solutions with thickener concentrations of 50% and more. The thickening agents, because of their unexpectedly low viscosity, can be handled very well, and they exhibit synergistic effects during thickening, especially of aqueous systems.

7 Claims, No Drawings

THICKENING AGENTS

TECHNICAL FIELD

The invention relates to thickening agents based on polyether derivatives.

BACKGROUND OF THE INVENTION

Thickening agents are used for thickening of the most diverse liquids. Natural and synthetic oils, water, aqueous electrolyte solutions and aqueous solutions of organic substances are cited as examples.

An important field of application of thickening agents is the preparation of functional liquids such as, for example, hydraulic fluids and metalworking fluids, on which stiff requirements regarding viscosity, shear stability and temperature behavior are imposed.

Thickening agents based on polyether derivatives are already known. Thus, in U.S. Pat. No. 4,521,326, the disclosure of which is expressly incorporated herein by reference, thickening agents based on polyether derivatives are described which are synthesized by adding alkylene oxide, namely ethylene oxide and/or propylene oxide, to an alcohol with at least 10 carbon atoms, and then adding a long-chain 1,2-epoxide with a chain length of 10 to 32 carbon atoms to the polyalkylene glycol monoether obtained thereby.

Further thickening agents, also synthesized on the basis of polyethers, are described in West German Laid-open Application 3,630,319. In the process indicated therein, monohydric alcohols with 8 to 30 carbon atoms are alkoxylated with a mixture of ethylene oxide and propylene oxide, the molar ratio of ethylene oxide to propylene oxide in the mixture being approximately 30:70 to 90:10 and 20 to 200 moles of alkylene oxide being used per mole of alcohol, and the resulting polyether is reacted in a molar ratio of 1:0.7 to 1:0.25 with a diisocyanate. The disclosure of this West German Laid-open Application is expressly incorporated herein by reference.

With such thickening agents it is possible significantly to increase the viscosity of numerous liquids. The polyether derivative can be dissolved directly in the liquid to be thickened; however, it is also possible to prepare so-called stock solutions and then use these for thickening.

One disadvantage in this procedure is that during use of such thickening agents, especially if they exist in solid form, prolonged stirring is needed in order to make the thickener effective. Problems can occur in many cases if the thickener can be dissolved only with difficulty in the liquids to be thickened, e.g., if the temperature must be raised in the dissolution process or if special stirring devices are necessary.

These difficulties can be partly circumvented by using so-called stock solutions, wherein a thickening-agent solution of the highest possible concentration is prepared and this stock solution is used for thickening the liquid.

A disadvantage in working with these stock solutions is that frequently it is not possible to prepare stock solutions with high concentrations, since the viscosity of the stock solutions increases rapidly with increasing concentration, so that such stock solutions are difficult to handle.

U.S. Pat. No. 4,491,526 describes thickening agents that can contain various polyether derivatives and that must also contain at least one surface-active ethoxylated polyether. Besides, it is recommended that an entire series of other additives including ethoxylated phosphoric acid esters be added to these thickening agents.

As a result of the addition of the surface-active ethoxylated polyethers, these thickening agents have a tendency to foam. Furthermore, they are highly viscous, especially at relatively high concentrations of the polyether derivative and of the surfactant. Also, in order to be able to dissolve relatively large quantities of the polyether derivative in water, a considerable quantity of surface-active substance must be added.

Although numerous thickening agents based on polyethers are already known, a need still exists for improved thickening agents, especially for such which exhibit the said disadvantages not at all or only to a reduced extent.

SUMMARY OF THE INVENTION

Accordingly, the invention has for an object the provision of a thickening agent that can be handled very well as a stock solution, that permits high concentrations of the polyether derivative in the stock solution and that ca be dissolved or dispersed in a simple manner in the liquid to be thickened.

This and other objects are achieved with a thickening agent which is based on polyether derivatives and water, and which is characterized by a polyether derivative with an average molecular weight of about 900 to about 75,000, a low-molecular-weight alkylene glycol alkyl ether, further common additives as required and water as the rest, up to 100%.

DETAILED DESCRIPTION OF PREFERRED EMBODIMENTS OF THE INVENTION

The thickening agent preferably contains polyether derivatives with an average molecular weight of 900 to 12,000. Alkylene glycol alkyl ethers with molecular weights up to 500, especially up to 300, preferably up to 200, are particularly suitable.

A particularly advantageous thickening agent contains 30 to 60 weight percent of the polyether derivative and 30 to 15 weight percent of the alkylene glycol alkyl ether. Low-molecular-weight mono-, di- or trialkylene glycol alkyl ethers are preferred. Low-molecular-weight alkylene glycol monoalkyl ethers, especially butyl ethers, are especially favorable.

In a particularly advantageous embodiment of the invention, the thickening agent contains a polyether derivative of the formula

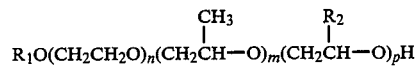

wherein $R_1$ is a hydrocarbon residue, which may or may not be substituted, with at least 10 carbon atoms, $n=10$ to 100, $m=0$ to 25, and $p=1$ to 3, and $R_2$ is an alkyl residue with 8 to 30 carbon atoms, with n, m and p being average values.

Preferably, these polyether derivatives have molecular weights of 900 to 10,000, especially 2,000 to 9,000. Very suitable are polyether derivatives wherein $n=40$ to 80, $R_1$ represents hydrocarbon residues with 10 to 22 carbon atoms, $R_2$ represents alkyl residues with 8 to 30 carbon atoms, and $p=1$ to 3 and $m=0$; preferably $n=50$ to 70, $p=1$ and $m=0$.

In a further particularly advantageous embodiment of the invention, the thickening agent contains a polyether derivative which is obtained by alkoxylating monohydric alcohols with 8 to 30 carbon atoms with a mixture of ethylene oxide and propylene oxide, the molar ratio of ethylene oxide to propylene oxide in the mixture being approximately 30:70 to 90:10 and 20 to 200 moles of alkylene oxide being used per mole of alcohol, and reacting the obtained polyether in a molar ratio of 1:0.7 to 1:0.25 with a diisocyanate.

Preferably, polyether derivatives of this type are used which are obtained by alkoxylating monohydric alcohols with 8 to 30 carbon atoms with a mixture of ethylene oxide and propylene oxide, the molar ratio of ethylene oxide to propylene oxide in the mixture being approximately 50:50 to 90:10 and 60 to 120 moles of alkylene oxide being used per mole of alcohol, and reacting the resulting polyether in a molar ratio of 1:0.5 to 1:0.25 with a diisocyanate.

In a further advantageous embodiment of the invention, the thickening agent contains a polyether derivative which is obtained by reacting aliphatic alcohols with 8 to 22 carbon atoms with a mixture of ethylene oxide and propylene oxide containing more than 20 weight percent of propylene oxide in a molar ratio of alcohol to alkylene oxide mixture of 1:40 to 1:150, then reacting the resulting polyether having random distribution of the ethylene and propylene oxides with 5 to 20 moles of ethylene oxide and bonding the resulting alkoxylation product, which contains an ethylene oxide block, with a diepoxide, 0.5 to 3 moles of alkoxylation product being used per mole of diepoxide in the bonding reaction. For this purpose, vinylcyclohexene dioxide and 1,2,7,8-diepoxyoctane in particular are preferred as the diepoxides. Polyethers of this type are described in more detail in German patent application no. P3,829,839.2, which application is expressly incorporated herein by reference.

In accordance with the invention, the alkylene glycol alkyl ethers can be used as mixtures of various alkylene glycol alkyl ethers; it is also possible to use mixtures of polyether derivatives.

The thickening agents according to the invention can be used especially favorably for thickening of aqueous systems, especially of hydraulic liquids and of aqueous systems for metal-working.

Polyether derivatives that can be used within the scope of the invention refer to polyether derivatives with an average molecular weight of at least about 900. A number of such polyether derivatives is already known; they can be obtained, e.g., by the addition of one or more alkylene oxides such as ethylene oxide or propylene oxide to a compound which contains one or more hydrogen atoms, such as, e.g., monohydric or polyhydric alcohols, etc. Among the monohydric alcohols, those with at least 10 carbon atoms are particularly suitable.

These polyethers can then be reacted with further compounds, a certain hydrophobing effect being achieved. For addition to the polyethers, long-chain 1,2-epoxides with a chain length of 10 to 32 carbon atoms are particularly suitable.

Such polyether derivatives are described, e.g., in U.S. Pat. No. 4,521,326.

In a particularly advantageous embodiment of the invention, polyether derivatives are used which are obtained by addition of alkylene oxides such as ethylene oxide and/or propylene oxide to such alcohols, followed by stepwise addition of a long-chain 1,2-epoxide. Such polyether derivatives are described in U.S. Pat. No. 4,521,326. Such polyether derivatives are described by the formula presented hereinbefore. Polyether derivatives in which m has the value of 0, i.e., polyether derivatives which are obtained merely by addition of ethylene oxide, and in which p=1, are especially suitable.

Low-molecular-weight alkylene glycol alkyl ethers within the scope of the invention refer to mono- and dialkyl ethers of low-molecular-weight glycols such as ethylene glycol, propylene glycol, diethylene glycol, dipropylene glycol, triethylene glycol, etc. Low molecular weight means that the polymeric compounds do not have average molecular weights higher than 500, but instead the average molecular weight is 500 at most, preferably 300 at most and especially 200 at most.

Low-molecular-weight alkylene glycol ethers which contain only 1 to 3 alkylene groups and the alkyl groups of which have 1 to 4 carbon atoms are especially suitable.

Examples of low-molecular-weight alkylene glycol alkyl ethers which have proven to be suitable within the scope of the invention are: ethylene glycol ethyl ether, ethylene glycol n-butyl ether, diethylene glycol ethyl dimethyl ether, diethylene glycol n-butyl ether, triethylene glycol dimethyl ether, propylene glycol methyl ether, propylene glycol ethyl ether, propylene glycol n-butyl ether, propylene glycol t-butyl ether, dipropylene glycol methyl ether and dipropylene glycol n-butyl ether.

In order to synthesize a thickening agent according to the invention, the following procedure can be used.

The polyether derivative as well as the low molecular weight alkylene glycol alkyl ether and water are mixed with each other in the desired concentrations and homogenized by stirring. This is done preferably at room temperature.

The quantitative ratios of the individual components can be varied within broad limits in the mixture. Thus, thickening agents which contain up to 5% and less of the polyether or up to 75% and more of the polyether can be obtained. The alkylene glycol ether can be present, e.g., in proportions of approximately 2.5 to 30 weight percent in the thickening agent. Larger or smaller proportions are possible depending on the intended use.

The proportion of water can also be varied within a large range depending on the intended use. Thus it is possible to mix up thickening agents with a water content of 10% and less and up to approximately 90% and more.

It is especially advantageous to mix together approximately 30 to 60 weight percent of the polyether and 30 to 15 weight percent of the alkylene glycol alkyl ether and the corresponding quantity of water missing up to 100%.

Mixing of the components is effected preferably at room temperature, and leads to stable thickening agents which can be stored for long periods.

Admixing of additives such as, e.g, dispersing agents and other agents is not necessary for mixing, since the stability of the thickening agent is excellent. Obviously, common additives can be admixed in the thickening agent. Such additives are known and they depend on the respective intended use of the thickening agent.

Thus corrosion inhibitors, pigments or lubricants and the like can be added if needed. Surfactants can also be coprocessed, e.g, if the thickening agent is to be used for thickening of nonaqueous sytems.

According to the invention, polyether derivatives, low-molecular-weight alkylene glycol ether derivatives and water can be mixed advantageously to a homogeneous thickening agent, especially in the form of highly concentrated stock solutions; very high concentrations in terms of the actual thickening substance, namely the polyether derivatives, can be attained.

Furthermore, it was particularly unexpected that the highly concentrated thickening agents have a much lower viscosity than thickening agents which contain water but not the low-molecular-weight alkylene glycol alkyl ether. Thus, e.g., a 15% aqueous solution of a polyether derivative of the type described in U.S. Pat. No. 4,521,326 has viscosities of 6,000 to 8,000 cSt, whereas a thickener solution according to the invention, which contains the same ether derivative, but in a concentration of 50%, has a viscosity of only about 200 cSt.

Because of the favorable viscosities, thickening agents incorporating the invention can very successfully be handled, processed, especially at room temperature, and weighed out; even transportation, e.g. by pumps, poses no difficulties of any kind.

The thickening agents according to the invention, even at high concentrations of the polyether derivative, generally exist at room temperature as clear solutions, which are so mobile that an excellent handling ability results therefrom.

A particularly surprising finding was that synergistic effects can be achieved in special applications by using the thickening agents embodying the invention. These effects comprise the phenomenon that, because of intermolecular interactions between the polyethers and the ethylene glycol alkyl ether, possibly with participation of other special components of the application-related formulation in question, higher viscosities can be achieved with a given thickener concentration than when using thickeners that contain no alkylene glycol alkyl ethers. Thus, it is possible to prepare highly concentrated stock solutions with low viscosities, which solutions, when diluted, e.g., with water to a hydraulic fluid, for their part exhibit a higher viscosity than is possible without the joint use of the alkylene glycol alkyl ether as provided for by the invention.

This effect is particularly advantageous when preparing hydraulic fluids with high water content. These include fluids such as HWBF types (high water-based fluids), which function as hydraulic fluids and which are used mainly as substitution products for hydraulic fluids based on mineral oils, water-glycol mixtures and many other substances.

The thickening agents according to the invention have high shear stability, both as the stock solution and after appropriate dilution in water.

However, they are applied not only in aqueous systems, but can also be used in other fields of application where thickening agents, especially as low-viscosity stock solutions based on polyethers, are desired.

The invention will be explained in more detail by the following examples, which are provided for illustration and not for limitation:

EXAMPLE 1

A polyether derivative corresponding to the general formula cited hereinbefore, prepared according to the teaching of U.S. Pat. No. 4,521,326, wherein $n=60$, $m=0$, $p=1$, $R_1=C_{16/18}H_{33/37}$, $R_2=C_{12}H_{25}$, is mixed with water and ethylene glycol butyl ether in such proportions that a solution of 50% of polyether derivative, 25% of water and 25% of alkylene glycol butyl ether is obtained. This solution has a viscosity of 195 cSt at room temperature.

EXAMPLES 2 TO 8

In the same way as described in Example 1, a solution of 50% of the polyether derivative, 25% of water and 25% of alkylene glycol alkyl ether is prepared by mixing at room temperature. The properties of the resulting solutions are presented in Table 1.

TABLE 1

| Example No. | Alkylene glycol alkyl ether | Viscosity in cSt at room temperature |
| --- | --- | --- |
| 2 | Diethylene glycol butyl ether | 310 |
| 3 | Propylene glycol methyl ether | 633 |
| 4 | Propylene glycol ethyl ether | 308 |
| 5 | Propylene glycol butyl ether | 207 |
| 6 | Propylene glycol t-butyl ether | 266 |
| 7 | Dipropylene glycol methyl ether | 626 |
| 8 | Dipropylene glycol butyl ether | 361 |

The following examples show the aqueous liquids that can be obtained when stock solutions, which are of the type described hereinbefore and which contain 50% of the polyether derivative, are diluted with water to form a solution that still contains 7.5% of the polyether derivative.

EXAMPLES 9 TO 16

By diluting 50% stock solutions with water, solutions are prepared which still contain 7.5% of the polyether derivative. The properties of the resulting solutions are presented in Table 2.

TABLE 2

| Example No. | Alkylene glycol alkyl ether | Viscosity in cSt at a temperature $T = 38°$ C. |
| --- | --- | --- |
| 9 | Ethylene glycol ethyl ether | 35 |
| 10 | Ethylene glycol n-butyl ether | 60 |
| 11 | Diethylene glycol butyl ether | 47 |
| 12 | Triethylene glycol dimethyl ether | 40 |
| 13 | Propylene glycol n-butyl ether | 87 |
| 14 | Propylene glycol t-butyl ether | 47 |
| 15 | Dipropylene glycol n-butyl ether | 113 |
| 16 (comparison example) | Without addition of an alkylene glycol alkyl ether | 34 |

All solutions indicated in Table 2 contain 7.5% of the polyether derivative. The experiments show that higher viscosities at 38° C. are obtained with the same proportion of feed polyether derivative according to the invention.

The following examples show which proportions of polyether derivative according to the invention are necessary in order to obtain an aqueous hydraulic fluid with a viscosity of 32 cSt at 38° C.

TABLE 3

| Example | Alkylene glycol alkyl ether | Percent of polyether derivative |
|---|---|---|
| 17 | Ethylene glycol n-butyl ether | 6.7% |
| 18 | Propylene glycol n-butyl ether | 6.2% |
| 19 | Propylene glycol t-butyl ether | 7.0% |
| 20 | Diethylene glycol n-butyl ether | 7.1% |
| 21 | Dipropylene glycol n-butyl ether | 6.0% |

In order to establish the viscosity of 32 cSt at 38° C. with the same polyether derivative without the addition of alkylene glycol alkyl ether, the addition of 7.5% of polyether derivative is necessary.

The polyether molecular weights indicated in the text are weight-average values.

EXAMPLE 22

Instruction for synthesizing a polyether derivative 260 g of tallow alcohol is mixed in a liquid state in an autoclave with 0.8 g of KOH powder and dehydrated for 60 minutes at 120° C. and 10 to 15 torr. Thereafter, the vacuum is relieved with nitrogen to a pressure of 0.4 bar. Next, 2,910 g of ethylene oxide and 813 g of propylene oxide in a mixture are added stepwise at 150° to 160° C. and 5 bar. After the reaction has ended, another 440 g of ethylene oxide is added at 150° to 160° C. and 5 bar. After the end of addition and subsequent reaction, the product is cooled. Thereafter 1,000 g of the liquid alkoxylate is charged into a dry three-necked flask flushed with nitrogen and equipped with stirrer, reflux condenser, contact thermometer, dropping funnel and vacuum and nitrogen connections, where it is mixed with 4 g of KOH powder. Dehydration is then performed for 30 minutes at 120° C. and 10 to 15 torr. Subsequently the vacuum is relieved with nitrogen, and 26.2 g of vinylcyclohexene dioxide is added dropwise at 120° C. in 30 minutes. After 90 minutes of subsequent reaction at 120° C., the product is cooled and discharged.

EXAMPLES 23 TO 25

In the same manner as described in Example 1, a solution is prepared from 50% of the polyether derivative of Example 22, 25% of water and 25% of alkylene glycol alkyl ether by mixing at room temperature. By diluting the 50% stock solution in water, solutions are prepared which still contain 5% of the polyether. The properties of the resulting solutions are presented in Table 4.

TABLE 4

| Example No. | Alkylene glycol alkyl ether | Viscosity in cSt at a temperature of 38° C. |
|---|---|---|
| 23 (comparison example) | Without addition of an alkylene glycol alkyl ether | 18.2 |
| 24 | Ethylene glycol mono-n-butyl ether | 26.4 |
| 25 | Dipropylene glycol n-butyl ether | 47.1 |

What is claimed is:

1. A thickening agent comprising:
    (a) from about 5% to 75% by weight of a polyether derivative thickener with an average molecular weight of about 900 to about 75,000, said polyether derivative being of the formula

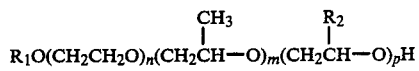

wherein $R_1$ is a substituted or unsubstituted hydrocarbon residue with at least 10 carbon atoms, $n=10$ to 1,000, $m=0$ to 25, $p=1$ to 3, and $R_2$ is an alkyl residue with 8 to 30 carbon atoms, n, m and p being average values;
    (b) from about 2.5% to about 30% by weight of a low-molecular-weight-alkylene glycol alkyl ether having an average molecular weight of about 500 or less; and
    (c) from about 10% to about 90% by weight water.
2. The thickening agent according to claim 1, wherein said polyether derivative has a molecular weight of 900 to 7,000.
3. The thickening agent according to claim 2, wherein said polyether derivative has a molecular weight of 2,000 to 4,000.
4. The thickening agent according to claim 1, wherein $n=40$ to 80, $R_1$ is a hydrocarbon residue with 10 to 22 carbon atoms, $R_2$ is an alkyl residue with 8 to 30 carbon atoms, $p=1$ to 3, and $m=0$.
5. A thickening agent comprising:
    (a) from about 5% to 75% by weight of a polyether derivative thickener with an average molecular weight of about 900 to about 75,000, wherein said polyether derivative is a product obtained by alkoxylating monohydric alcohols with 8 to 30 carbon atoms with a mixture of ethylene oxide and propylene oxide, a molar ratio of ethylene oxide to propylene oxide in the mixture being approximately 30:70 to 90:10, and 20 to 200 moles of alkaline oxide being used per mole of alcohol, and by reacting the resulting polyether with a diisocyanate in a molar ratio of 1:0.7 to 1:0.25;
    (b) from about 2.5% to about 30% by weight of a low-molecular-weight alkylene glycol alkyl ether having an average molecular weight of about 500 or less; and
    (c) from about 10% to about 90% by weight water.
6. The thickening agent according to claim 5, wherein said molar ratio of ethylene oxide to propylene oxide is approximately 50:50 to 90:10, 60 to 120 moles of alkylene oxide are used per mole of alcohol, and the resulting polyether is reacted with said diisocyanate in a molar ratio of 1:0.5 to 1:0.25.
7. The thickening agent according to claim 1, wherein $n=50$ to 70, $m=0$, and $p=1$.

* * * * *

UNITED STATES PATENT AND TRADEMARK OFFICE
CERTIFICATE OF CORRECTION

PATENT NO. : 4,971,722

DATED : November 20, 1990

INVENTOR(S) : Elke PHILIPPSEN

It is certified that error appears in the above-identified patent and that said Letters Patent is hereby corrected as shown below:

Col. 2, line 24, change "ca" to --can--.

Signed and Sealed this

Twenty-first Day of April, 1992

Attest:

HARRY F. MANBECK, JR.

Attesting Officer

Commissioner of Patents and Trademarks